United States Patent [19]

Hill

[11] Patent Number: 5,704,676
[45] Date of Patent: Jan. 6, 1998

[54] MULTI-TEMPERATURE CARGO TRANSPORTATION APPARATUS

[75] Inventor: John Adam Hill, Savannah, Ga.

[73] Assignee: Great Dane Limited Partnership, Chicago, Ill.

[21] Appl. No.: 447,274

[22] Filed: May 22, 1995

[51] Int. Cl.⁶ .................................................. B60P 3/20
[52] U.S. Cl. .................... 296/24.1; 62/441; 296/181
[58] Field of Search ....................... 296/24.1, 181; 220/1.5; 105/355, 404; 410/129, 130; 62/239, 441, 447

[56] References Cited

U.S. PATENT DOCUMENTS

| | | |
|---|---|---|
| 2,934,372 | 4/1960 | Jewell et al. . |
| 3,564,771 | 2/1971 | Reynolds . |
| 3,897,971 | 8/1975 | Evans . |
| 4,003,728 | 1/1977 | Rath . |
| 4,049,311 | 9/1977 | Dietrich et al. . |
| 4,080,906 | 3/1978 | Brown . |
| 4,221,421 | 9/1980 | Bettker, Jr. et al. . |
| 4,236,366 | 12/1980 | Rijnders . |
| 4,277,095 | 7/1981 | Barruw .................................. 296/24.1 |
| 4,358,233 | 11/1982 | Morris et al. . |
| 4,360,553 | 11/1982 | Landheer . |
| 4,459,821 | 7/1984 | Cabell et al. . |
| 4,505,126 | 3/1985 | Jones et al. . |
| 4,553,584 | 11/1985 | Bloomquist . |
| 4,565,071 | 1/1986 | Bartling et al. . |
| 4,639,031 | 1/1987 | Truckenbrodt . |
| 4,712,383 | 12/1987 | Howland et al. ...................... 62/239 X |
| 4,726,196 | 2/1988 | Zajic . |
| 4,880,342 | 11/1989 | Pradovic . |
| 5,026,112 | 6/1991 | Rice ...................................... 296/181 |
| 5,054,295 | 10/1991 | Goulooze . |
| 5,105,629 | 4/1992 | Parris et al. . |
| 5,129,235 | 7/1992 | Renken et al. ......................... 62/239 |

FOREIGN PATENT DOCUMENTS

| | | |
|---|---|---|
| 0025420 | 3/1981 | European Pat. Off. . |
| 0340743 | 11/1989 | European Pat. Off. . |
| 61-222835 | of 1986 | Japan . |
| 88/02705 | 4/1988 | WIPO .................................. 296/24.1 |

OTHER PUBLICATIONS

"New 'S.T.A.' Side Filler combines with Equipco Split-bulkhead Load Dividers", Equipco, Chicago IL, Oct. 1963.
F/G Products, Inc., Center Partition, Multi-Temperature Refrigeration Systems, Unmatched flexibility for Simultaneous Hauling of Fresh and Frozen Products, Nov. 1991.
Thermo King, Invert-A-Temp System, U.S.A., Nov. 1991.

*Primary Examiner*—David M. Mitchell
*Assistant Examiner*—Kia M. Robinson
*Attorney, Agent, or Firm*—Dority & Manning, P.A.

[57] ABSTRACT

A cargo transportation apparatus includes an elongated body having a front end and a rear end and defining an interior cavity. The body is configured to selectively define at least three longitudinal compartments within the interior cavity and to provide access to each longitudinal compartment from the rear end. The apparatus also includes an air conditioning system configured to independently control temperature within at least two of the selectively definable longitudinal compartments.

25 Claims, 5 Drawing Sheets

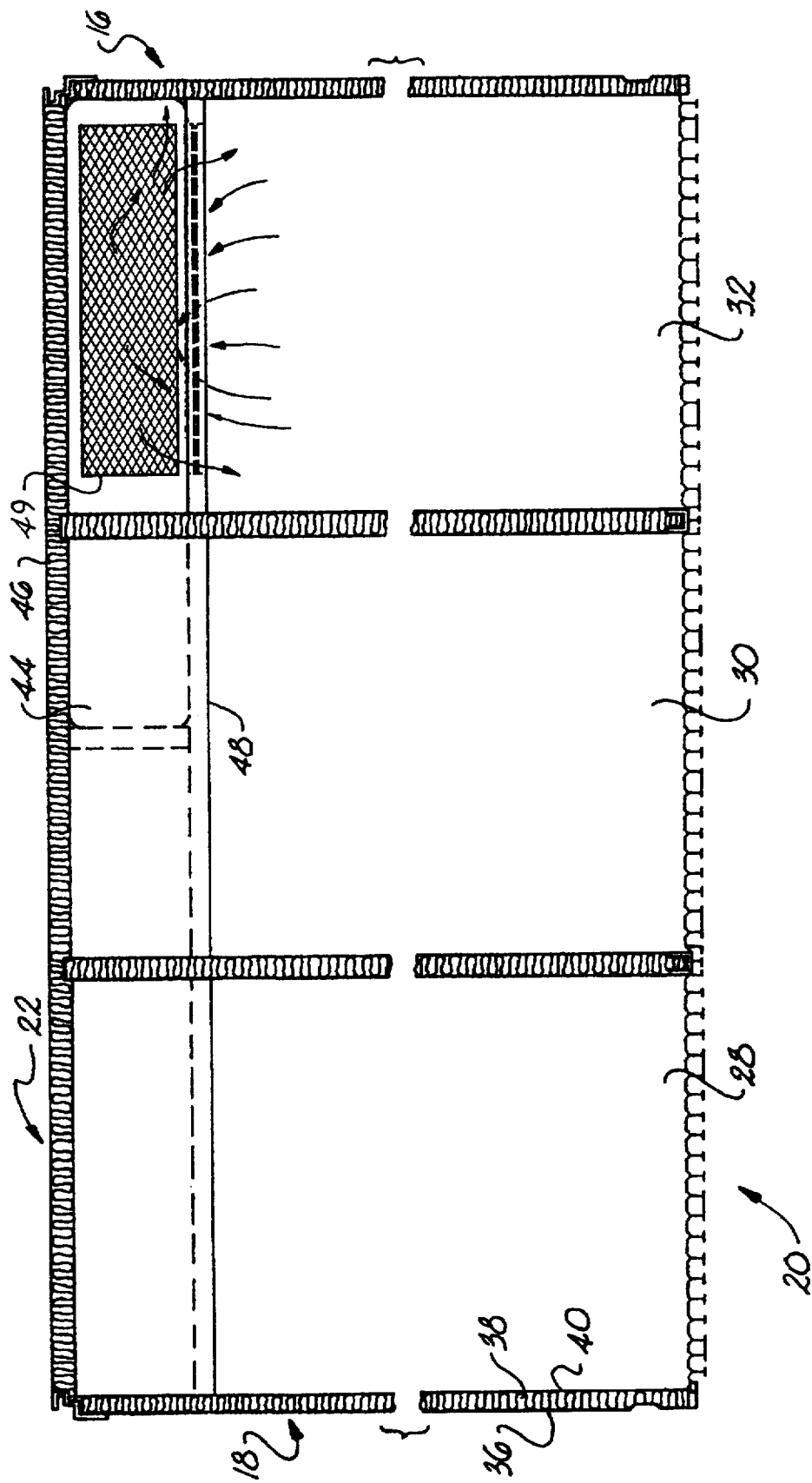

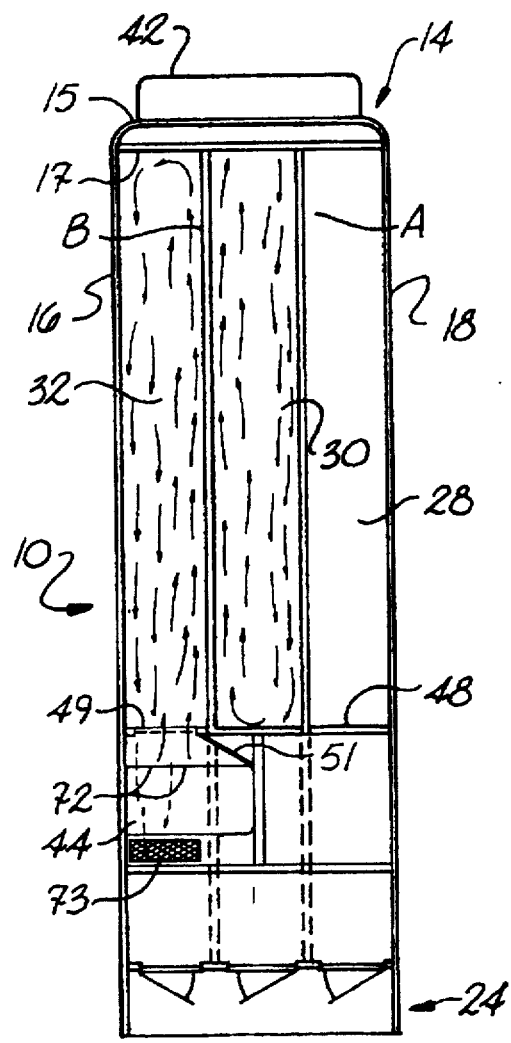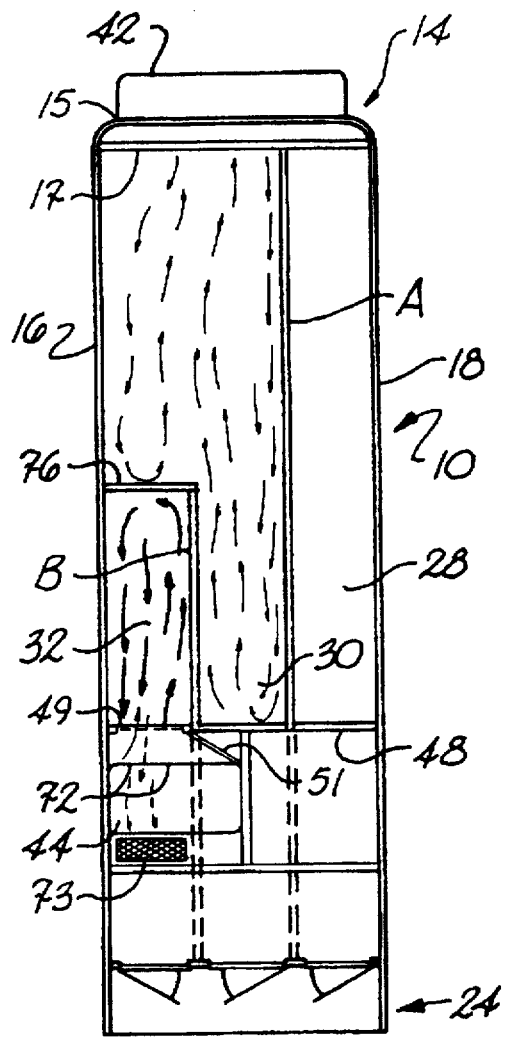

MULTI-TEMPERATURE CARGO TRANSPORTATION APPARATUS

BACKGROUND OF THE INVENTION

The present invention relates to cargo transportation apparatus such as trailers and containers of the type frequently used to transport cargo, for example foodstuffs. More particularly, the invention relates to improvements in cargo transportation apparatus construction to permit independent temperature control within selectively definable longitudinal compartments of such apparatus.

Distributors and carriers supplying restaurants and other food service businesses must frequently haul different types of products at varying temperatures. For example, many restaurants require frozen goods such as meats, refrigerated goods such as vegetables, and dry goods such as paper products.

Multi-temperature trailers were developed to permit delivery of such products in a single shipment. Such trailers are of various designs but generally divide a trailer cavity into two or three compartments. A host air conditioning unit services at least one compartment. If necessary, a remote air conditioning unit, for example an evaporator unit associated with the host air conditioning system, may service a second compartment. Thus, for example in a three compartment configuration, the host air conditioning system may be used to control temperature in a freezer compartment while the remote unit maintains temperature in a refrigerated compartment. The third compartment thus remains at ambient temperature.

Generally, multi-temperature trailers accommodate at most two parallel compartments extending to the trailer's rear end. Accordingly, in a three compartment configuration, a driver may access only two compartments directly from the rear. Such designs offer access to the third compartment either from an exterior door on the trailer's side or an interior door within the trailer cavity.

Side door designs may be problematic because of the difficulty in placing or securing ramps or steps proximate the side door. The lack of such aids to assist in unloading cargo or product requires drivers to lift such product from the trailer to the ground or to a loading dock, increasing the incidence of driver fatigue. Such a design is also inefficient because it requires product double handling. To unload the compartment, the driver must move product close to the door and then either give it to a second operator or exit the trailer and perform the second step himself. These difficulties may result in higher costs to the carrier due to greater inefficiency.

While an interior door permits a driver to unload product from a step or ramp at the end of the trailer, it does not eliminate problems resultant of double handling as set forth above. Furthermore, interior doors often create "dead" space within the trailer cavity. If the trailer is loaded to its maximum capacity, the interior door will be blocked. Thus, the driver may not load or unload the third compartment when the trailer is otherwise full. Unless a "dead" space is left open in the loaded trailer from the trailer's rear to the interior door, the driver may not unload the third compartment until a path is cleared. Accordingly, an interior door design may require a choice between inefficient product handling and lost cargo space.

Based on the foregoing, a need exists for a cargo transportation apparatus having at least three compartments that are accessible from the rear, that may be independently temperature controlled, and that may be selectively defined within the unit's cavity.

SUMMARY OF THE INVENTION

The present invention recognizes and addresses the foregoing disadvantages, and others of prior art construction and method.

Accordingly, it is an object of the present invention to provide an improved cargo transportation apparatus for use in transporting goods which may be maintained at varying temperatures.

More particularly, it is an object of the present invention to provide such an apparatus having at least three longitudinal compartments that are accessible from the unit's rear.

It is also an object of the present invention to provide such an apparatus having longitudinal compartments that may be selectively defined within a unit's cavity to accommodate delivery needs.

It is another object of certain embodiments of the present invention to provide an improved cargo transportation apparatus that can utilize refrigeration equipment that is readily available to a user, without the necessity of substantial customization.

Some of these objects are achieved by a cargo transportation apparatus including an elongated body defining an interior cavity and configured to selectively define at least three longitudinal compartments within the interior cavity. The body provides access to each longitudinal compartment from a rear end thereof. An air conditioning system independently controls temperature within at least two of the selectively definable longitudinal compartments.

One presently preferred cargo transportation apparatus includes an elongated body comprising a front end, a rear end, a plurality of sides, a floor, and a ceiling. A plurality of dividers are attachable to the floor and ceiling and extend to the rear end to selectively define the longitudinal compartments. Thus, the dividers may be arranged within the interior cavity to define each longitudinal compartment according to cargo needs. For example, one compartment may encompass one-half the volume of the interior cavity while two other compartments may each encompass one-quarter.

The dividers may be constructed in various manners. Each may comprise, for example, a unitary structure. However, in a preferred embodiment they would be comprised of sections, including, for example, longitudinal partitions and perhaps at least one transverse bulkhead in communication with at least one longitudinal partition. The partitions are sections of the divider extending from the floor to the ceiling that may be fitted together end to end longitudinally within the interior cavity to form one or more sides of the longitudinal compartments. If these partitions extend from the front end to the rear end, no transverse bulkhead is needed. Such a bulkhead may, for example, be used to form a front end of a longitudinal compartment depending on storage needs as will be set forth in more detail below.

In yet another preferred embodiment, the air conditioning system comprises a first air conditioning unit in operative communication with a first longitudinal compartment and a second air conditioning unit in operative communication with a second longitudinal compartment. An air conditioning unit may comprise, for example, a self-contained unit, an evaporator, controlled vented ducts, or equivalent apparatus. The first air conditioning unit may furthermore comprise a host unit where the second air conditioning unit comprises a remote unit dependent upon the host unit. For example, the host unit may be a nose-mounted cooling unit as is known in the art, and the remote unit may be an evaporator unit operating in conjunction with the host unit as is well known to those skilled in the art.

It should be understood by those of ordinary skill in the art that "air conditioning" may include refrigeration, freezing, and heating as needed. Thus, "air conditioning" is intended to encompass devices capable of at least one of such operations and equivalents thereof.

In another preferred embodiment, the cargo transportation apparatus ceiling comprises a main ceiling extending from the front end to the rear end and a dropped ceiling extending from the main ceiling down into the interior cavity to the dividers and rearwardly to the rear end. The dropped ceiling thus creates a second cavity which may house the remote air conditioning unit and which may, for example, receive a sliding rear door. Similarly, both air conditioning units may be positioned rearwardly of the front end. The positioning of the remote air conditioning unit toward the rear permits greater flexibility in manipulating the position of the dividers to selectively define the longitudinal compartments.

The longitudinal partitions may be secured to the cargo transportation apparatus by pairs of opposing troughs defined by the floor and the ceiling. The troughs are configured to receive the partitions and to substantially prevent air flow transversely between the longitudinal compartments.

The cargo transportation apparatus may also comprise a rear end having at least one rear bulkhead defining a door associated with a corresponding longitudinal compartment and permitting access thereto. In a preferred embodiment, the rear bulkheads may be positioned at a distance within the interior cavity forward of the rearmost point of the cargo apparatus to provide a storage area for loading equipment such as handtrucks and the like. A rear door assembly is secured to the rear end to receive and secure a vertically sliding door which, in its open position, may be received into the second cavity between the main ceiling and the dropped ceiling as described above. It should be appreciated, however, that swinging doors could be utilized instead of a vertically sliding door.

It should be understood by those of ordinary skill in the art that the term "cargo transportation apparatus" as used herein may include various cargo structures transportable over the road, by rail, by sea, or otherwise. Such structures include, but are not limited to, trailers, bi-modal containers, and the like. Accordingly, the examples discussed below depicting a cargo transportation apparatus embodied as an insulated van trailer are provided by way of example only and not by way of limitation.

The accompanying drawings, which are incorporated and constitute a part of the specification, illustrate various embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art is set forth in the remainder of the specification, which makes reference to the appended drawings, in which:

FIG. 3 is a cross-sectional view of the cargo transportation apparatus as in FIG. 1 illustrating a dropped ceiling and a main ceiling and a remote air conditioning unit secured therebetween;

FIG. 4A is a top cross-sectional view of a cargo transportation apparatus constructed in accordance with the present invention employing longitudinal partitions and illustrating the operation of an air conditioning system to independently control temperature within two longitudinal compartments;

FIG. 4B is a top cross-sectional view of a cargo transportation apparatus constructed in accordance with the present invention employing longitudinal partitions and a transverse bulkhead to define longitudinal compartments;

Figure 1:
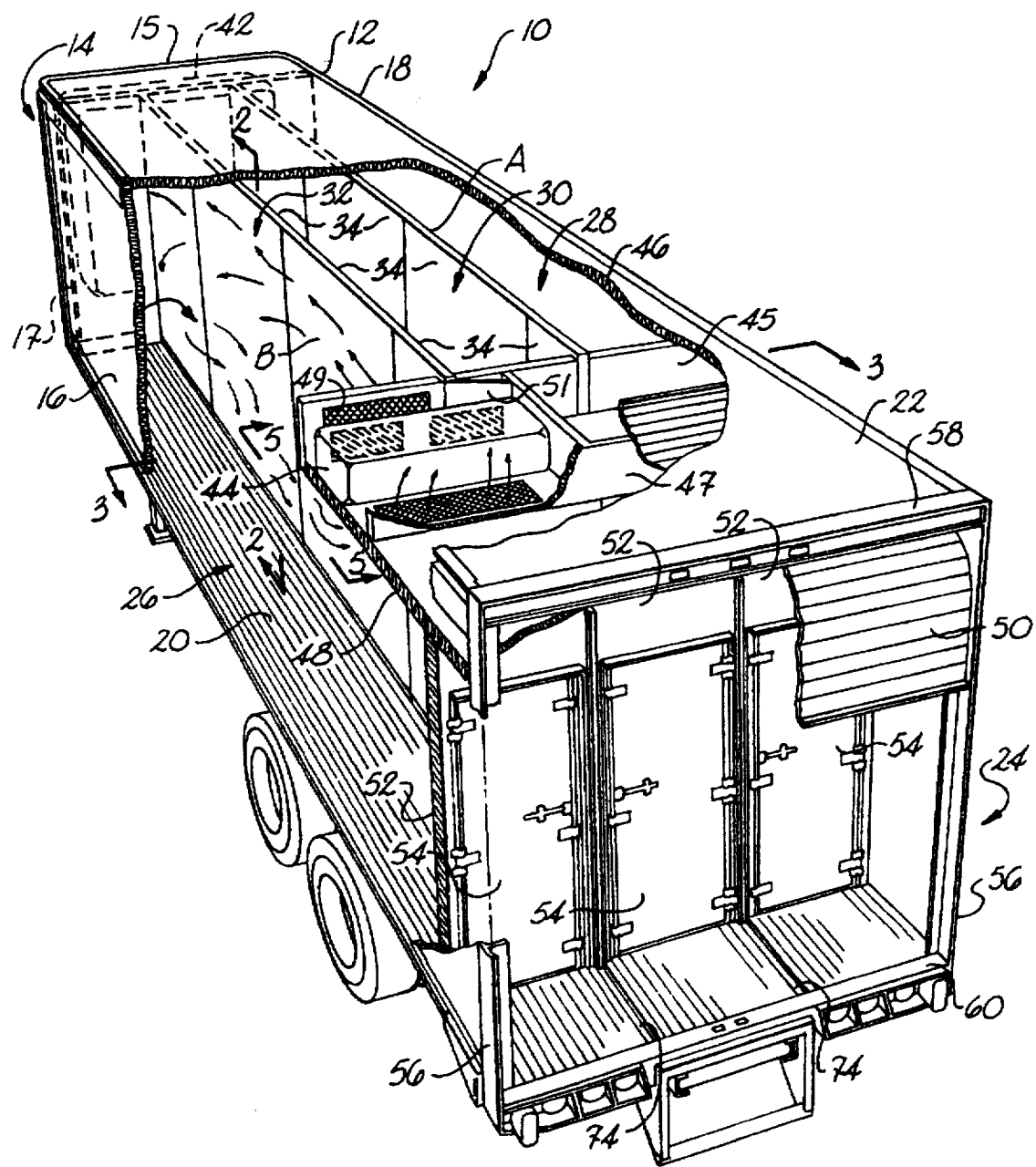
FIG. 1 is an isometric view of a cargo transportation apparatus constructed in accordance with the present invention in partial cross section.

Repeat use of reference characters in the present specification and drawings is intended represent same or analogous features or elements of the invention.

DETAILED DESCRIPTION OF PREFERRED EMBODIMENTS

Reference will now be made in detail to the presently preferred embodiments of the invention, one or more examples of which are illustrated in the accompanying drawings. Each example is provided by way of explanation, not limitation of the invention. It will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present invention is concerned with an improved cargo transportation apparatus. Accordingly, FIG. 1 illustrates a presently preferred embodiment of such an apparatus depicted as a trailer, shown generally at 10. Trailer 10 includes an elongated body 12, including front end 14, sides 16 and 18, floor 20, ceiling 22, and rear end 24.

Trailer 10 defines an interior cavity indicated at 26 and defined by front end 14, rear end 24, sides 16 and 18, ceiling 22, and floor 20. Cavity 26 is divided into longitudinal compartments 28, 30, and 32 by dividers A and B. Dividers A and B are comprised of longitudinal partitions 34 extending between ceiling 22 and floor 20. It should be understood that dividers A and B may each comprise, for example, a single partition or a plurality of connected partitions. Additionally, although partitions 34 are shown in FIG. 1 as following a straight lengthwise direction from the front end to the rear end, it should be understood that such partitions may deviate from such a configuration while generally defining sides of the longitudinal compartments.

The walls of trailer 10 are insulated. For example, referring to FIG. 3, sides 16 and 18 and ceiling 22 include walls comprising an outer skin 36, insulation 38, and inner skin 40.

Referring again to FIG. 1, trailer 10 includes an air conditioning system comprising a host air conditioning unit shown in phantom at 42 and a remote air conditioning unit 44. As will be discussed in more detail below, the air conditioning system is configured to independently control temperature within at least two of longitudinal compartments 28, 30, and 32.

Front end 14 comprises a front wall 15 and an air return bulkhead 17. In a preferred embodiment, air return bulkhead 17 is placed approximately eight inches rearward from front wall 15 and enables the placement of vents to direct air flow into, and to receive air return from, a particular compartment or compartments. Such a construction permits the convenient use of a typical nose-mounted cooling unit. Those of ordinary skill in the art should understand, however, that various equivalent front end constructions are encompassed by the present invention, including, for example, employing a cooling unit mounted on front wall 15 having vents configured to independently serve one or more desired compartments.

Figure 5:
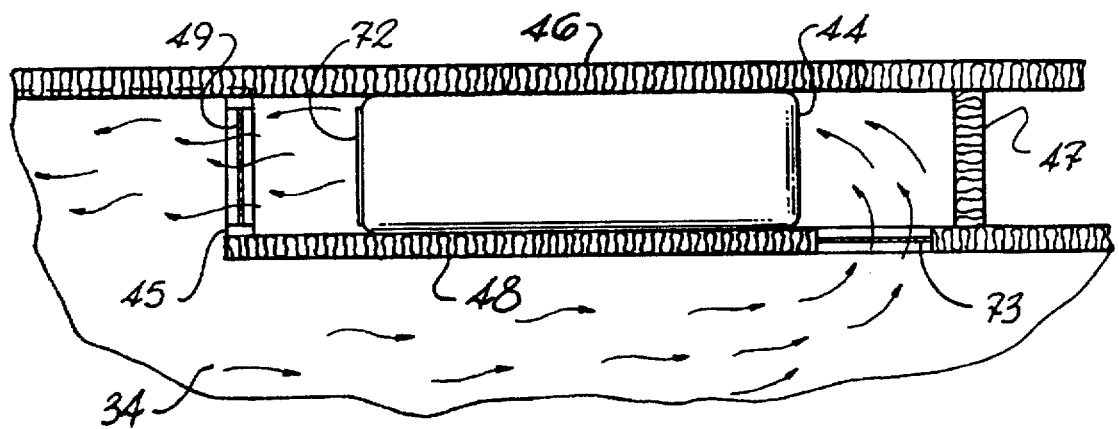
FIG. 5 is a partial side cross-sectional view of the cargo transportation apparatus as in FIG. 1 illustrating a main and a dropped ceiling and a remote air conditioning unit secured therebetween.

Ceiling 22 comprises a main ceiling 46 extending from front end 14 to rear end 24 and a dropped ceiling 48 extending down from main ceiling 46 to dividers A and B and rearwardly to rear end 24. Remote air conditioning unit 44 is secured in a cavity formed between main ceiling 46 and dropped ceiling 48 and is positioned generally between a forward wall 45 and a back wall 47. Air from unit 44 is guided to vent 49 at least partially by air diverter 51. Air conditioning unit 44 thereby independently serves longitudinal compartment 32. Air returns from compartment 32 by a return vent in dropped ceiling 48 between unit 44 and back wall 47 (FIG. 5).

The second cavity is also configured to receive sliding rear door 50 as shown. It should be understood that an entire air conditioning system may be housed in the second cavity or that multiple remote units may be housed there. It should furthermore be understood that a single unit housed in such cavity may be configured to independently service more than one compartment.

Rear end 24 comprises three rear bulkheads 52 defining three doors 54 providing access to longitudinal compartments 28, 30, and 32 as shown. Main ceiling 46, sides 16 and 18, and floor 20 extend rearwardly from rear bulkhead 52 to a rear door assembly including rear side rails 56, top rear rail 58, and bottom sill 60.

Figure 2:
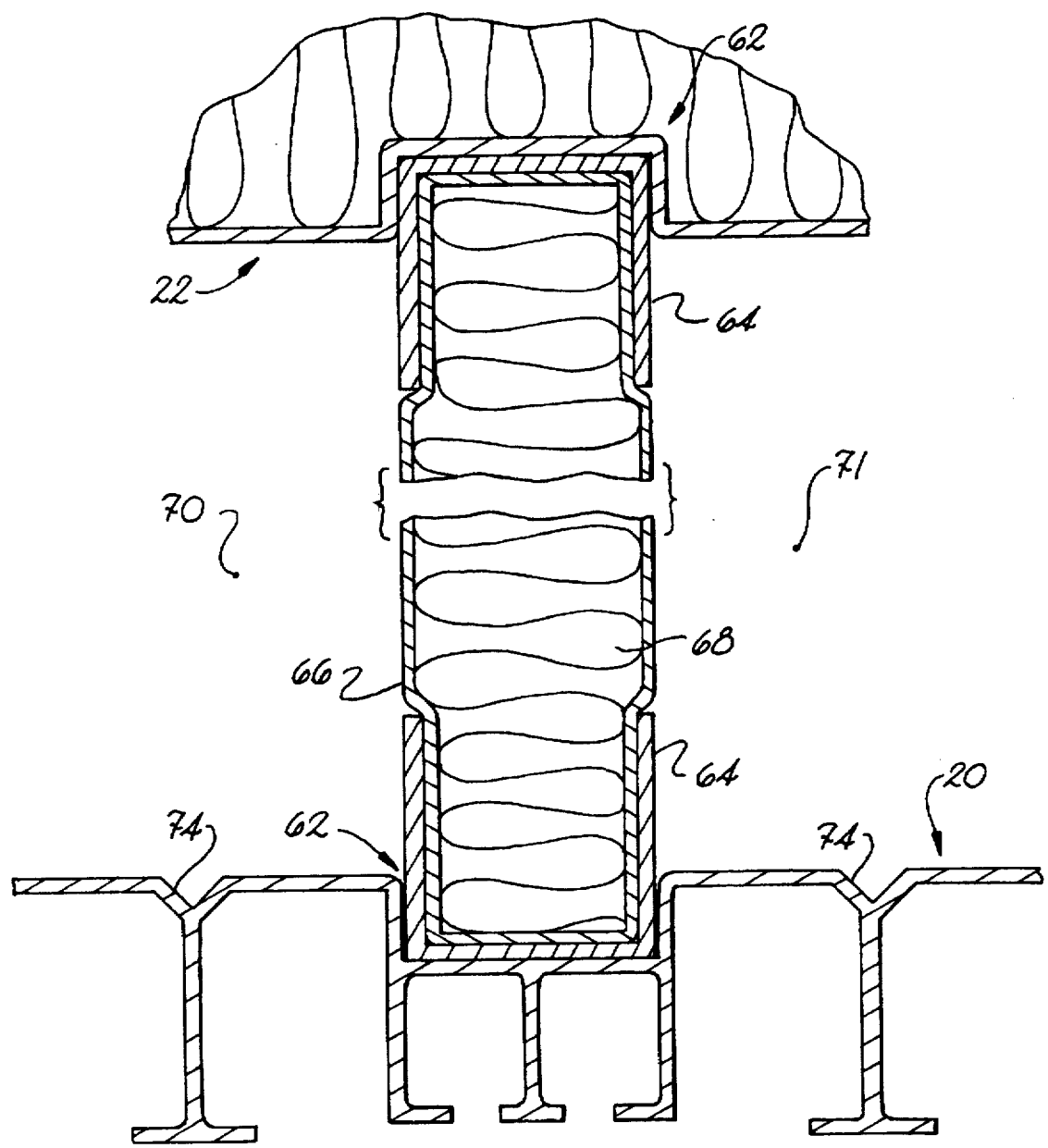
FIG. 2 is a cross-sectional view of a longitudinal partition received by opposing troughs defined in the floor and ceiling of a cargo transportation apparatus constructed in accordance with the present invention.

FIG. 2 cross-sectionally illustrates a longitudinal partition 34 attached to ceiling 22 and floor 20 within a pair of troughs, indicated at 62, defined therein. Partition 34 may also include protective closures 64 as shown for protecting partitions 34 and assisting in sliding in troughs 62. It should be appreciated that closures 64 are optional and may be included only on the bottom of partitions 34 or omitted completely.

Partition 34 is comprised of an outer skin 66 and insulated inner area 68. Accordingly, partition 34 establishes an insulated barrier between longitudinal compartments 70 and 71. Furthermore, partitions 34 fit within troughs 62 in such a manner as to substantially prevent air flow between longitudinal compartments 70 and 71.

Referring again to FIG. 3, a cross-sectional view of trailer 10 as indicated in FIG. 1 is provided. Remote air conditioning unit 44 is secured between dropped ceiling 48 and main ceiling 46, leaving air vents 72 (not shown) (see FIG. 1) exposed only to longitudinal compartment 32 via vent 49. Thus, remote air conditioning unit 44 operatively communicates only with longitudinal compartment 32 even though its width is greater than that of longitudinal compartment 32.

Remote air conditioning unit 44 may consist of a remote evaporator within a larger air conditioning system that includes a host air conditioning unit 42 as in FIG. 1. As is understood in the art, a conventional refrigeration circuit may include a refrigerant compressor, condenser, expansion means, and evaporator connected to form a refrigerant flow circuit. Thus, remote air conditioning unit 44 may be a remote evaporator, incorporated within the larger air conditioning system, that serves only longitudinal compartment 32. Vents 72 and 49 provide an air outlet for longitudinal compartment 32 while not affecting air flow in longitudinal compartments 30 and 28. It should be appreciated that while remote air conditioning unit 44 is illustrated as attached to the ceiling, it could also be attached to a suitable location on the side wall of the body.

FIG. 5 provides another partial cross-sectional view of trailer 10, as indicated in FIG. 1, illustrating a side view of main ceiling 46, remote air conditioning unit 44, dropped ceiling 48, and a partition 34. As shown, partition 34 follows main ceiling 46 to and along dropped ceiling 48 and does not extend through dropped ceiling 48. Thus, longitudinal compartment 32 is bounded by a plurality of partitions 34, side 16, floor 20, main ceiling 46, dropped ceiling 48 and rear bulkhead 52. Vent 49 permits air flow from vents 72 to longitudinal compartment 32. Air returns to remote air conditioning unit 44 via vent 73 in dropped ceiling 48.

Referring now to FIG. 4A, a top sectional view of trailer 10 configured as in FIG. 1 is shown. Longitudinal compartments 28, 30, and 32 extend from front end 14 to rear end 24. Host air conditioning unit 42 is in operative communication only with longitudinal compartment 30 while remote air conditioning unit 44 operatively communicates with longitudinal compartment 32. The arrows indicate air flow within longitudinal compartments 30 and 32. Referring again to FIG. 2, floor 20 is provided with spaced grooves 74 which facilitate air flow when product is stacked on floor 20. It should be understood by those of ordinary skill in the art that various vent configurations are possible to facilitate desired air flow patterns, as well as various floor configurations such as a channel design or a duct-T-duct configuration.

Referring again to FIG. 4A, airflow arrows are not indicated rearward of dropped ceiling 48, indicating that the area between main ceiling 46 and dropped ceiling 48 is substantially insulated from air flow within the longitudinal compartments. It should be understood, however, that host air conditioning unit 42 and remote air conditioning unit 44 control temperature throughout the entirety of compartments 30 and 32, including those areas between dropped ceiling 48 and floor 20.

Figure 4C:
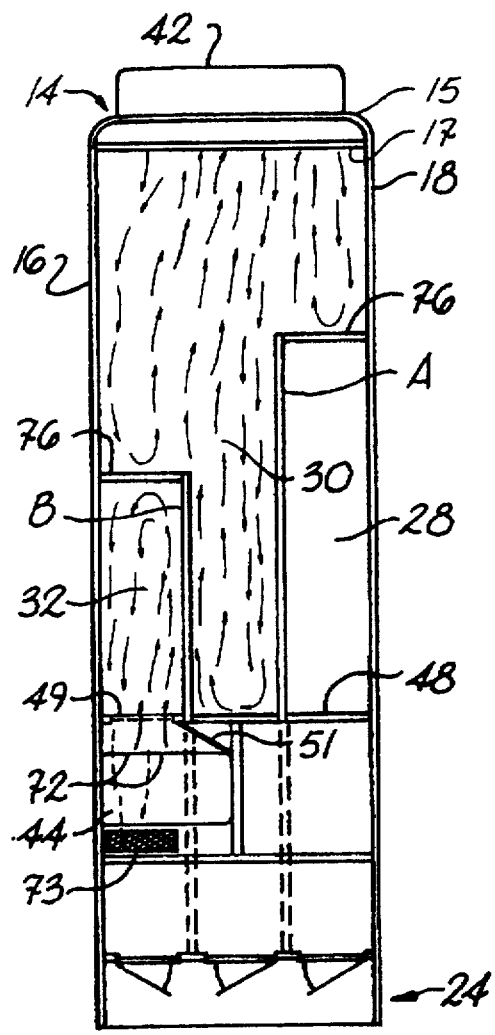
FIG. 4C is a top cross-sectional view of a cargo transportation apparatus constructed in accordance with the present invention employing longitudinal partitions and two transverse bulkheads to define longitudinal compartments.

Referring now to FIG. 4B, another possible configuration of trailer 10 is illustrated. In this arrangement, longitudinal compartment 32 does not reach front end 14 but, rather, extends from rear bulkhead 52 to transverse bulkhead 76. Similarly, FIG. 4C illustrates a configuration of trailer 10 wherein compartment 28 extends from rear bulkhead 52 to a transverse bulkhead 76.

FIGS. 4A, 4B, and 4C illustrate that body 12 may be configured to selectively define at least three longitudinal compartments within interior cavity 26. The compartment dimensions may be adjusted by altering the configuration of dividers A and B while maintaining access to each compartment through the trailer's rear and while maintaining the ability to independently control temperature in at least two of the compartments. This configuration effectively allows for transports of refrigerated, frozen, and dry goods by a single trailer or container without the necessity of side doors.

It should be understood that the embodiments illustrated in the accompanying drawings are provided by way of example only and not by way of limitation. For example, the air conditioning system may comprise independent air conditioning units, dependent air conditioning units, for example independently controlled remote vents or ducts incorporated within a single air conditioning system, or any other equivalent air conditioning system capable of independently controlling temperature within at least two selectively definable longitudinal compartments.

Additionally, for example, longitudinal compartment configuration may be adjusted by changing the transverse position of the longitudinal partitions. Thus, while FIG. 1 illustrates a trailer having two evenly spaced pairs of opposing troughs 74 that result in three longitudinal compartments of approximately equal width, it is understood that other such trough pairs or equivalent attachment means may be provided to enable attachment of longitudinal partitions at other locations. Accordingly, the longitudinal compartments may have various shapes and may even have a longitudinal length less than the transverse width.

It should also be appreciated that while a plurality of dividers is disclosed to define the three compartments, the plurality of dividers might be connected at some point. As used herein, such a construction nevertheless defines two dividers, not one. For example, a first divider might extend in a relatively straight line from the cavity's rear to its front. A second divider might form an "L" shape, extending from the rear to turn and terminate at the first divider.

Accordingly, while various preferred embodiments of the invention have been described above, it is to be understood that any and all equivalent realizations of the present invention are included within the scope and spirit thereof. For example, a single bulkhead without a storage area may comprise the rear end of the trailer. Furthermore, for some cargo transportation apparatus requirements, the manufacturer may define a desired compartment configuration by permanently fixing the dividers to the body. Alternatively, for example, the apparatus may be configured so that an operator may define the compartments as needed by re-positioning the dividers. The embodiments thus depicted are presented by way of example only and are not intended as limitations upon the present invention. While particular embodiments of the invention have been described and shown, it will be understood by those of ordinary skill in this art that the present invention is not limited thereto, since many modifications can be made. Therefore, it is contemplated that any and all such embodiments are included in the present invention as may fall within the literal or equivalent scope of the appended claims.

What is claimed is:

1. A cargo transportation apparatus, the apparatus comprising:
an elongated body having a front end and a rear end and defining an interior cavity, said body defining at least three longitudinal compartments within said interior cavity and providing access each said longitudinal compartment from said rear end, and
an air conditioning system configured to independently control temperature within at least two of said longitudinal compartments, said air conditioning system including a first air conditioning unit in operative communication with a first said longitudinal compartment and a second air conditioning unit disposed rearward of and spaced from said front end and in operative communication with a second said longitudinal compartment and extending into the interior of at least said first and second longitudinal compartments.

2. The apparatus as in claim 1, wherein said elongated body comprises a plurality of sides, a floor, and a ceiling.

3. The apparatus as in claim 2, wherein said body is insulated.

4. The apparatus as in claim 2, comprising a plurality of dividers attachable to said floor and ceiling and extending toward said rear end to selectively define said longitudinal compartments.

5. The apparatus as in claim 4, wherein each said divider comprises at least one longitudinal partition.

6. The apparatus as in claim 5, wherein at least one of said dividers comprises at least one transverse bulkhead in communication with at least one of said longitudinal partitions.

7. The apparatus as in claim 1, wherein said second air conditioning unit is disposed proximate said rear end.

8. The apparatus as in claim 1, wherein said first air conditioning unit comprises a host air conditioning unit and said second air conditioning unit comprises a remote air conditioning unit dependent upon said host air conditioning unit.

9. The apparatus as in claim 8, wherein said remote air conditioning unit is an evaporator unit.

10. The apparatus as in claim 7, wherein said elongated body includes two sides, a floor and a ceiling and wherein said first air conditioning unit is secured to said front end and said second air conditioning unit is secured to said ceiling.

11. The apparatus as in claim 10, wherein said ceiling comprises a main ceiling extending from said front end to said rear end and a dropped ceiling extending from at least a portion of said main ceiling into said interior cavity and configured to secure said second air conditioning unit between said dropped ceiling and said main ceiling.

12. A cargo transportation apparatus, the apparatus comprising:
an elongated body defining an interior cavity and comprising a front end, a rear end, two sides, a floor, and a ceiling,
a plurality of dividers attachable to said floor and ceiling and extending toward said rear end to define at least three longitudinal compartments within said interior cavity, wherein each said divider comprises at least one longitudinal partition and wherein said rear end is configured to provide access to each said longitudinal compartment,
a plurality of pairs of opposing troughs defined by said floor and said ceiling, said troughs configured to receive and substantially secure said longitudinal partitions to substantially prevent air flow transversely between said longitudinal compartments, and
an air conditioning system configured to independently control temperature within at least two of said longitudinal compartments, said air conditioning system including a first air conditioning unit in operative communication with a first said longitudinal compartment and a second air conditioning unit disposed rearward of and spaced from said front end and in operative communication with a second said longitudinal compartment and extending into the interior of at least said first and second longitudinal compartments.

13. The apparatus as in claim 12, wherein at least one of said dividers comprises at least one transverse bulkhead in communication with at least one of said longitudinal partitions.

14. The apparatus as in claim 12, wherein said second air conditioning unit is disposed proximate said rear end.

15. The apparatus as in claim 12, wherein said first air conditioning unit comprises a host air conditioning unit and said second air conditioning unit comprises a remote air conditioning unit dependent upon said host air conditioning unit.

16. The apparatus as in claim 15, wherein said remote air conditioning unit is an evaporator unit.

17. The apparatus as in claim 15, wherein said host air conditioning unit is secured to said front end and said remote air conditioning unit is secured to said ceiling.

18. The apparatus as in claim 17, wherein said ceiling comprises a main ceiling extending from said front end to said rear end and a dropped ceiling extending from said main ceiling into said interior cavity and configured to secure said remote air conditioning unit between said dropped ceiling and said main ceiling, said dropped ceiling extending into the interior of at least first and second said longitudinal compartments.

19. A cargo transportation apparatus, said apparatus comprising:
   an elongated insulated body defining an interior cavity and comprising a front end, a rear end, a plurality of sides, a floor, and a ceiling;
   a plurality of dividers attachable to said floor and ceiling and extending substantially to said rear end to define at least three longitudinal compartments within said interior cavity, wherein each said divider comprises at least one longitudinal partition, wherein said dividers are configured to attach to said elongated body to substantially prevent air flow transversely between said longitudinal compartments, and wherein said ceiling comprises a main ceiling extending from said front end to said rear end and a dropped ceiling extending from said main ceiling to said dividers and said rear end, said dropped ceiling extending into the interior of at least two said longitudinal compartments; and
   an air conditioning system configured to independently control temperature within at least two of said longitudinal compartments, said air conditioning system comprising a host air conditioning unit generally secured to said front end and in operative communication with a first said longitudinal compartment, and a remote evaporator unit dependent upon said host air conditioning unit, disposed rearward of and spaced from said front end between said dropped ceiling and said main ceiling, and in operative communication with a second said longitudinal compartment.

20. The apparatus as in claim 19, wherein said floor and said ceiling define a plurality of pairs of opposing troughs configured to receive and substantially secure said longitudinal partitions.

21. The apparatus as in claim 20, wherein at least one said dividers comprises at least one of transverse bulkhead in communication with at least one of said longitudinal partitions.

22. The apparatus as in claim 21, wherein said rear end comprises at least one rear bulkhead, said at least one rear bulkhead defining a door associated with a corresponding one of said at least three longitudinal compartment and permitting access thereto.

23. The apparatus as in claim 22, including three said rear bulkheads, each said bulkhead including a said door.

24. The apparatus as in claim 22, wherein said rear end further comprises
   a storage area extending rearwardly from said rear bulkhead and defined by said floor, ceiling and sides, and
   a rear door assembly configured to receive and secure a vertically sliding door, and
   wherein said main ceiling and said dropped ceiling are configured to receive said sliding door therebetween.

25. The apparatus as in claim 1, wherein said ceiling comprises a main ceiling extending from said front end to said rear end and a dropped ceiling extending from said main ceiling into said interior cavity and configured to secure said second air conditioning unit between said dropped ceiling and said main ceiling, said dropped ceiling extending into the interior of at least two said longitudinal compartments.

* * * * *